United States Patent [19]
Jih

[11] Patent Number: 6,078,548
[45] Date of Patent: Jun. 20, 2000

[54] CPU CAPABLE OF MODIFYING BUILT-IN PROGRAM CODES THEREOF AND METHOD FOR THE SAME

[75] Inventor: Hwa-Jang Jih, Taoyuan Hsien, Taiwan

[73] Assignee: Winbond Electronics Corporation, Hsinchu, Taiwan

[21] Appl. No.: 09/264,426

[22] Filed: Mar. 8, 1999

[51] Int. Cl.[7] .................................................. G11C 8/00
[52] U.S. Cl. ...................................... 365/236; 365/230.02
[58] Field of Search .............................. 365/236, 230.03, 365/230.02

[56] References Cited

U.S. PATENT DOCUMENTS

| | | | |
|---|---|---|---|
| 5,097,447 | 3/1992 | Ogawa et al. | 365/236 |
| 5,426,612 | 6/1995 | Ichige et al. | 365/236 |
| 5,923,599 | 7/1999 | Hii et al. | 365/236 |

*Primary Examiner*—Son T. Dinh
*Attorney, Agent, or Firm*—Holland & Hart LLP

[57] ABSTRACT

A CPU includes a program counter, a ROM, a RAM with a size smaller than the ROM, a special instruction detecting circuit and a multiplexer. A special instruction is written in an address of the RAM corresponding to the memory address, where the program codes are to be replaced, of the ROM. When the memory counter directs to the memory address containing the special instruction of the RAM, the special instruction is detected by the special instruction detecting circuit so that the content of the program counter is modified, and the multiplexer is switched to the RAM. Accordingly, in a subsequent cycle, the modified program codes stored in the RAM are directly sent to be executed. A jump instruction is added to the end of the modified program codes in the RAM, so that after the modified program codes are executed, the operation is returned to the ROM. Therefore, the CPU can modify built-in program codes thereof with a low cost.

19 Claims, 5 Drawing Sheets

CPU CAPABLE OF MODIFYING BUILT-IN PROGRAM CODES THEREOF AND METHOD FOR THE SAME

BACKGROUND OF THE INVENTION

1. Field of the Invention

The present invention relates to a CPU capable of modifying built-in program codes thereof and a method for modifying built-in program codes of the CPU, more particularly, to a CPU, which can modify the built-in program codes thereof by combining a ROM and a RAM as a program memory thereof.

2. Description of Related Art

Some constant program codes are necessary for a CPU to operate normally. Considering the cost, a read-only memory (ROM) is generally used as a program memory for storing programs and data codes.

FIG. 1 shows a general construction of the CPU, which comprises a program counter 50, a program memory 60, an instruction register 70, a decoder 80 and an executing unit 90. In a first cycle, the program counter 50 reads data in respective memory addresses of the program memory 60 in sequence, and transmits the data into the instruction register 70. In a second cycle, the instruction register 70 sends an instruction obtained according to the data to the decoder 80, which decodes the instruction. Then the decoded instruction is sent to the executing unit 90 to execute a program in a third cycle.

As mentioned above, a ROM is typically used as the program memory 60, the reasons for which are described as follows. The capacity of the ROM is usually larger than that of a RAM, and the cost of the ROM is lower than the RAM. In addition, most of the built-in programs of the CPU have no need to be amended, so all of the CPUs currently available utilize ROMs as program memories thereof.

However, if the program codes in the ROM have bugs, it is not possible to modify the program codes. Therefore, the CPU having bugs in the built-in programs has to be abandoned, resulting in increase of cost and trouble of operation. Although other types of memories, such as EPROM, EEPROM, FLASH ROM and SRAM, can be used as the program memory 60, however, as there are usually only a few codes which need to be amended, it is not necessary to use such expensive memories.

Accordingly, a method to solve the above problems is needed.

SUMMARY OF THE INVENTION

One object of the present invention is to provide a CPU which can modify built-in program codes thereof.

Another object of the present invention is to provide a method for modifying built-in program codes of a CPU with low cost.

In accordance with one aspect of the present invention, the CPU comprises a program counter, a ROM, a RAM with a size smaller than the ROM, a special instruction detecting circuit and a multiplexer. A special instruction is written in an address of the RAM corresponding to the memory address, where the program codes are to be replaced, of the ROM. When the memory counter directs to the memory address containing the special instruction in the RAM, the special instruction is detected by the special instruction detecting circuit so that the content of the program counter is modified, and the multiplexer is switched to the RAM. Accordingly, in a next cycle, the modified program codes stored in the RAM are directly sent to be executed. A jump instruction is added to the end of the modified program codes in the RAM, so that after the modified program codes are executed, the operation is returned to the ROM.

In accordance with another aspect of the present invention, a special instruction, which instructs the CPU to transfer from the ROM to the RAM to read data therein, is provided to an address of the RAM in correspondence to an address of the ROM where the data is to be modified. When the special instruction is detected, the CPU neglects data in the ROM and transfers to read the data in the RAM to perform the modification.

In accordance with a further aspect of the present invention, memory addresses of the RAM correspond to the lower addresses of the ROM. When a program counter directs to an address of the ROM, data of the corresponding lower address of the RAM is also read. The read data is detected by a special instruction detecting circuit to determine whether the data contains the special instruction. If the special instruction is detected, the program codes of the ROM are substituted by the program codes of the RAM.

In accordance with still a further aspect of the present invention, the special instruction contains an operation code (op code), a page selecting code and a target address code. The operation code is used for identifying the special instruction. The page selecting code is compared with a higher address of the program counter to determine whether the memory address of the ROM is the proper address to be modified. The target address code leads the, program counter to read the modified program codes in the RAM.

In accordance with still a further aspect of the present invention, the program counter transmits a selecting signal to a multiplexer of the CPU when the program counter transfers to the RAM to read the modified program codes. The multiplexer switches between the ROM and the RAM according to the selecting signal to transmit the program codes selectively from the ROM or the RAM to the proceeding units of the CPU to execute.

Other objects, advantages and novel features of the invention will become more apparent from the following detailed description when taken in conjunction with the accompanying drawings.

DETAILED DESCRIPTION OF PREFERRED EMBODIMENT

Figures 1, 7:
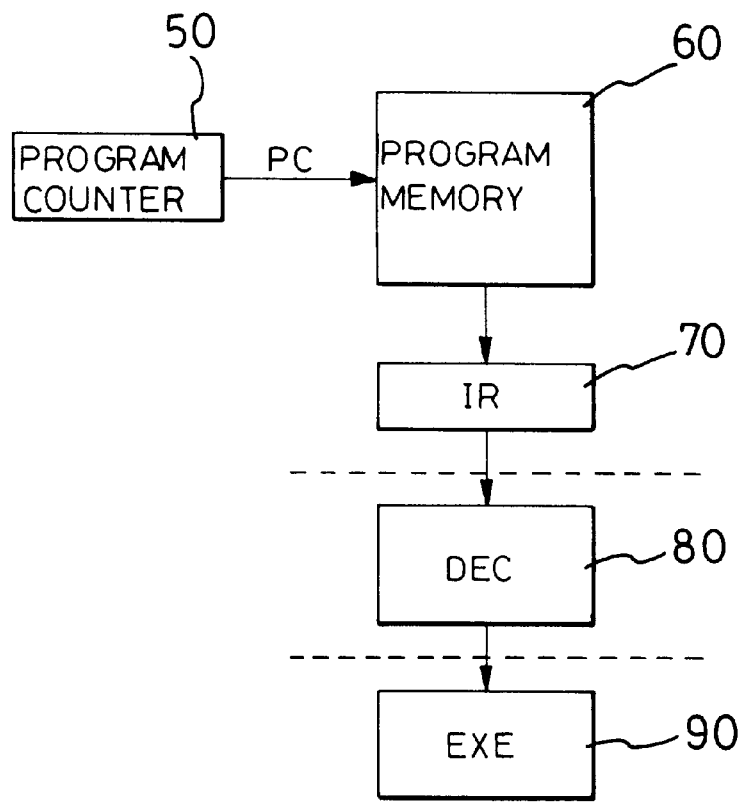
FIG. 1 is a block diagram showing a construction of a CPU containing a (conventional built-in program memory.
FIG. 7 shows outputs of respective units of the CPU in different operation cycles in accordance with the example of FIG. 6.
Figure 2:
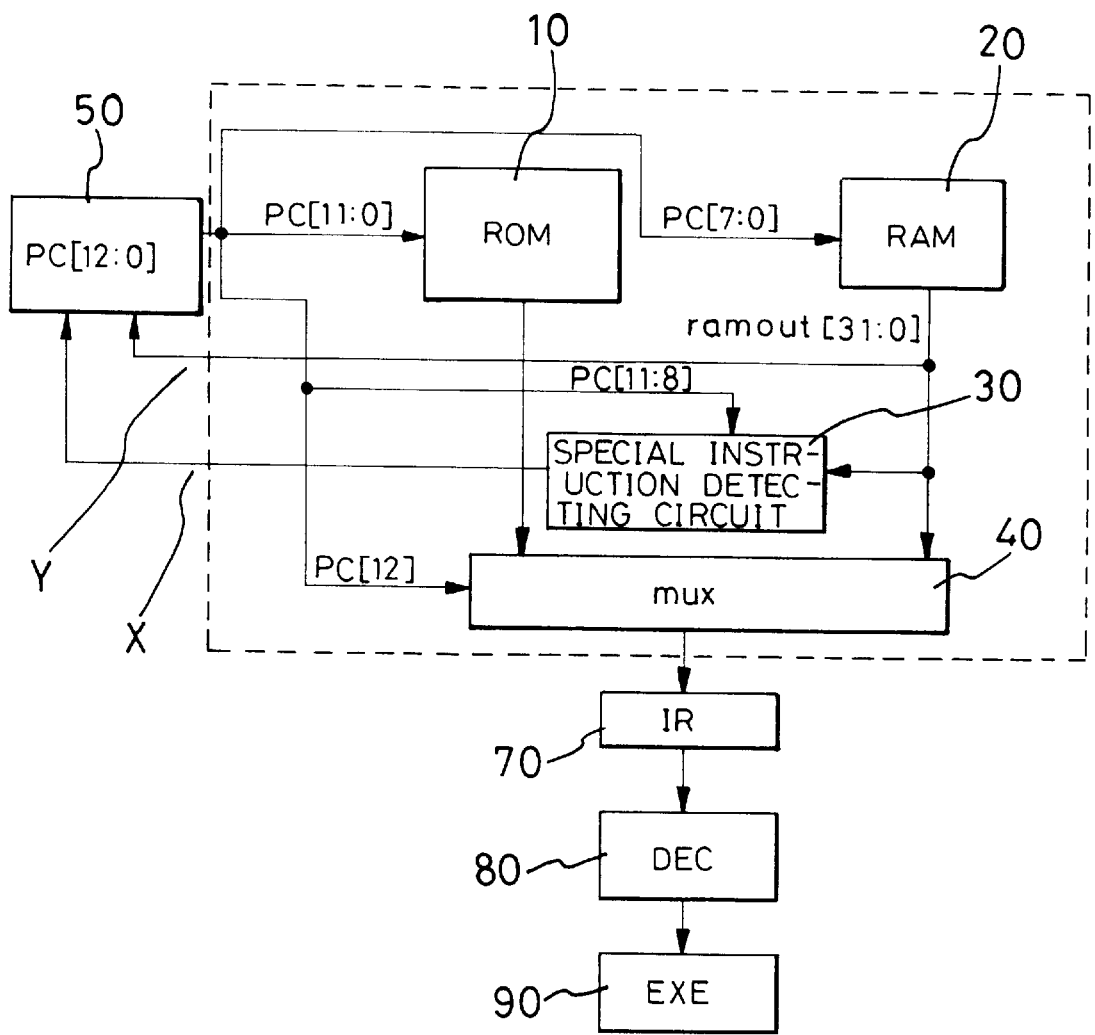
FIG. 2 is a block diagram showing a construction of a CPU in accordance with the present invention.

Comparing FIG. 2 to FIG. 1, the feature of a CPU in accordance with present invention different to the prior art is enclosed in a block indicated by dashed lines. Specifically, the program memory of the prior art is replaced by a ROM 10, a small size RAM 20 (capacity of which is one-sixteenth of the capacity of the ROM 10 in this case), a special instruction detecting circuit 30 and a multiplexer 40.

A program counter 50 of the CPU is a counter of 13 bits, an address PC[1:0] thereof is used to access the ROM 10, and a lower address PC[7:0] is used to access the RAM 20. Accordingly, the contents of the ROM 10 and the RAM 20 can be read simultaneously. The thirteenth bit PC[12] of the program counter 50 is used to access a selecting terminal of the multiplexer 40, so that the state (0 or 1) of the highest bit is used as a switching signal for the multiplexer 40 to drive the multiplexer 40 to switch between the ROM 10 and the RAM 20. The switching of the multiplexer 40 can determine data of which one of the ROM 10 and the RAM 20 is transmitted to the subsequent stage, such as an instruction register 70, a decoder 80 and an executing unit 90.

The special instruction detecting circuit 30 is directly connected with an output terminal of the RAM 20 to detect whether there is a special instruction in the data output from the RAM 20. An address signal of a higher address PC[11:8] is sent to the special instruction detecting circuit 30 for identifying the address of the ROM 10 where the program codes are to be modified. If the result of the identification is positive, the special instruction detecting circuit 30 transmits an identification signal X to the program counter 50, and leads a target address signal Y from the RAM to be sent to the program counter 50. The program counter 50 thus restarts to count according to the loaded data. At the time that the identification signal X is sent to the program counter 50, the state of the thirteenth bit PC[12] of the program counter 50 is changed, causing, the multiplexer 40 to be switched to the RAM 20. Accordingly, the data of the RAM is read according to the count of the program counter 50 to be executed by the subsequent stage of the CPU.

The special instruction is written in a lower address of the RAM 20 corresponding to the address of the ROM 10 where the program codes are to be abandoned, so that the special instruction can be automatically read. A new address is loaded to the program counter 50 according to the special instruction. Accordingly, the modified program codes stored in the RAM 20 are sent to be executed in the next operation cycle.

A jump instruction is added at the end of the modified program codes of the RAM 20, so that the operation can be returned to the ROM 10 after the modified program codes have been executed.

Figure 3:
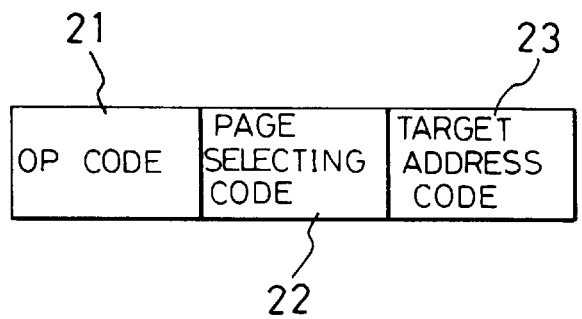
FIG. 3 shows a format of a special instruction in accordance with the present invention.

Referring to FIG. 3, a format of the special instruction can be divided into an operation code (op code) 21 for identification, a page selecting code 22 indicating the higher address of the ROM 10, and a target address code 23 indicating the address of the RAM where the operation is to be transferred to.

Figure 4:
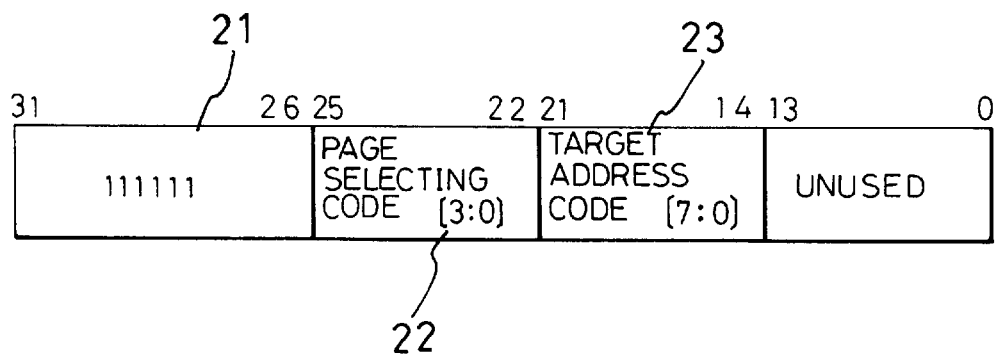
FIG. 4 shows an embodiment of the special instruction in accordance with the present invention.

Referring to FIG. 4, in correspondence to the embodiment shown in FIG. 2, the format of the special instruction can be set as follows: the op code 21 indicated by 6 bits (26–31 bits) is written as "111111", the page selecting code 22 is indicated by 4 bits (22–25 bits), and the target address code 23 is indicated by 8 bits (14–21). The remaining portion of the special instruction is an unused area. The op code 21 is used for the special instruction circuit 30 to identify whether the detected instruction is the special instruction. The page selecting code 22 is used to prevent the operation from being transferred to another lower address, which is also corresponding to the address of ROM 10 where the data is to be replaced, other than the correct lower address. The page selecting code 22 is used to be compared with the higher address PC[11:8] sent to the program counter 50. The target address code 23 indicates the address of the RAM where the operation is to be transferred to. After determining there is no error, the special instruction detecting circuit 30 transmits an identification signal X as mentioned above to substitute the program codes of the RAM 20 for the ROM 10 program codes to be abandoned.

Figure 5:
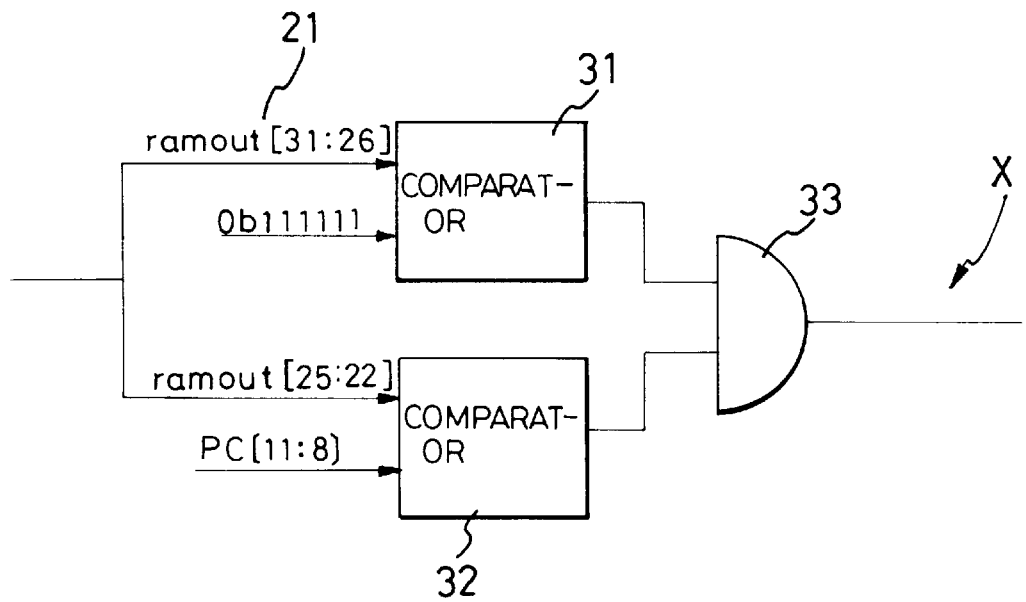
FIG. 5 is a circuitry diagram of a special instruction detecting circuit in accordance with the present invention.

The special instruction detecting circuit 30 can be implemented by utilizing comparators. Referring to FIG. 5, a comparator 31 compares the op code 21 with a predetermined code, and a comparator 32 compares the page selecting code 22 with the address PC[11:8], the respective comparison results are sent to an AND gate 33. If both of the comparison results are positive, the AND gate 30 outputs a high identification signal X, which indicates that the operation should be transferred to read the program codes of the RAM 20.

Figure 6:
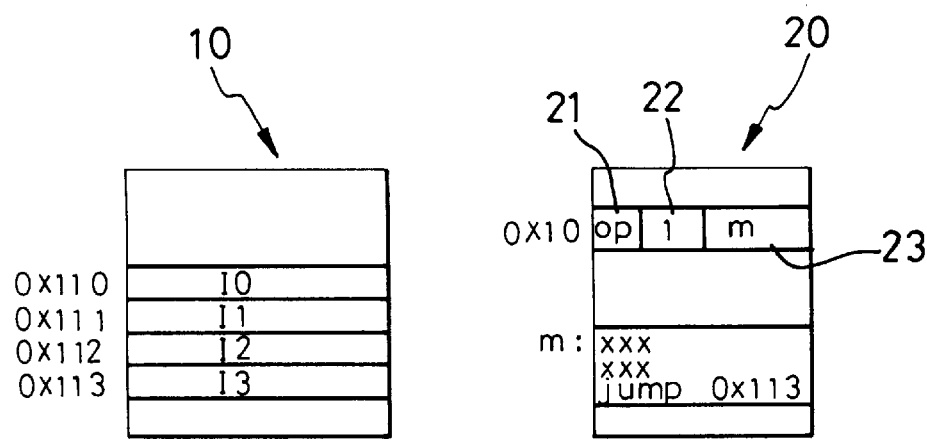
FIG. 6 shows an example for illustrating transfer of operation between a ROM and a RAM in accordance with the present invention.

Next, an example of the operation will be described referring to FIG. 6 and FIG. 7. Assume that the addresses 0x111 to 0x112 of the ROM 10 are in the position where the program codes (i.e. I1 and I2) are to be replaced, data in a lower address 0x10 of the RAM 20 is read with the data in a higher address 0x110 of the ROM 10 by the special instruction circuit 30. As can been seen in FIG. 6, there is a special instruction in the position indicated by the address 0x10 of the RAM 20, the special instruction is identified by checking the op code 21. The page selecting code 22 is "1", which is identical to the higher address of the ROM 10. The special instruction detecting circuit 30 accordingly transmits an identification signal X with a high level to the program counter 50, and loads the content "m" of the target address code 23 of the special instruction to the program counter 50. Therefore, in a next cycle (cycle 2 of FIG. 7), the content of the program counter 50 is changed from "110" to "m", and restarts to count from the address "m", that is, subsequent to reading the data of the address 0x110 of the ROM 10, the reading operation is transferred directly to the address "m" of the RAM 20 to read the modified program codes.

At the time that the reading operation is transferred to read the data of the RAM 20, the state of the highest bit PC[12] of the program counter 50 is also changed to switch the multiplexer 40 to an output side of the RAM 20. Accordingly, in a third cycle, the decoder 80 receives the program codes in the address "m" of the RAM 20.

A jump instruction "jump 0x113" is added at the end of the data in the address "m". When the jump instruction is read, the program counter 50 is cleared and a new address ("0x113" in this case) is loaded to the program counter 50, and the highest bit PC[12] is also cleared to be low. The reading operation is thus returned to the ROM 10 to read the data in the address. 0x113. It should be noted that the program codes of the addresses 0x111 and 0x112 are neglected.

Figure 8:
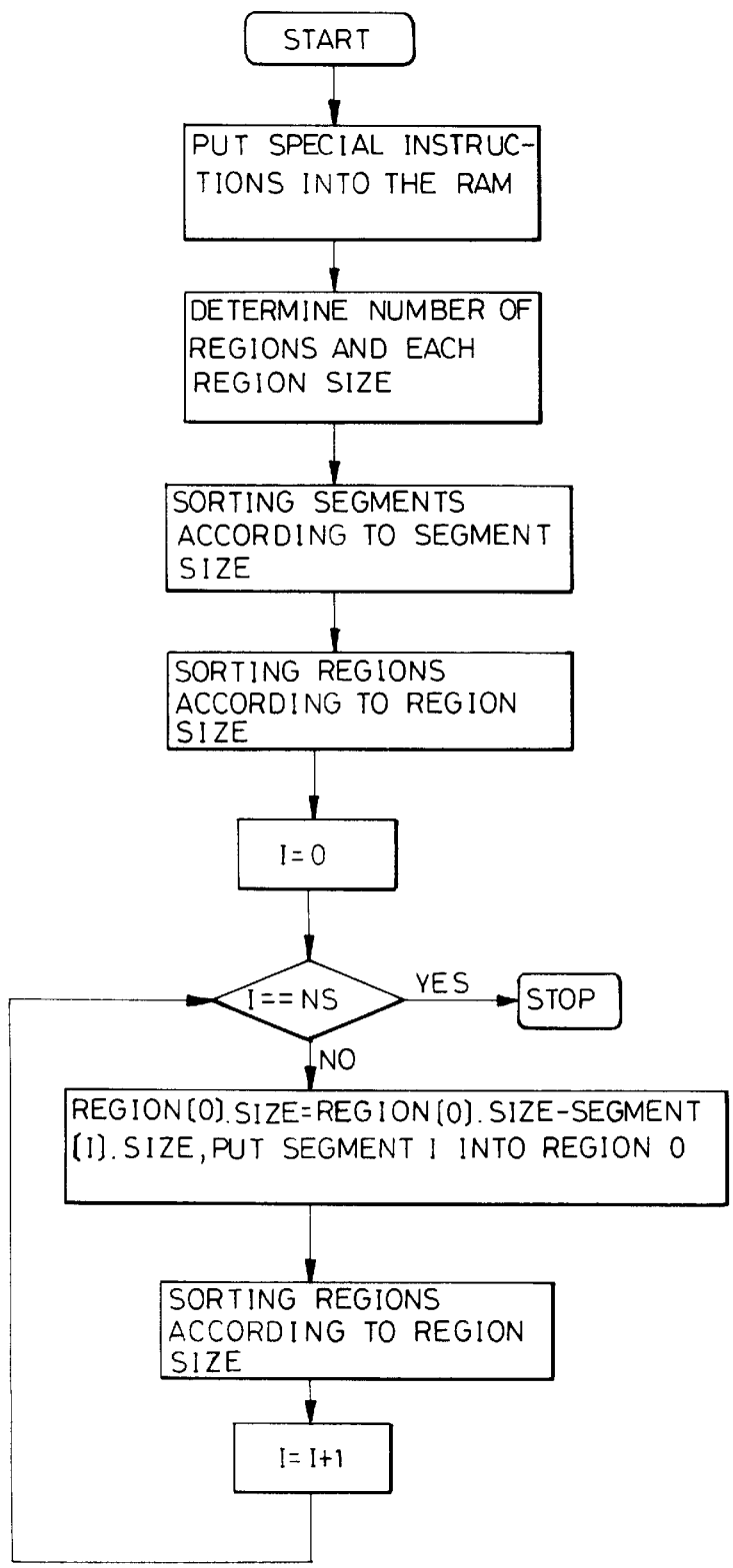
FIG. 8 is a flow chart showing a method for optimizing the utilization of the memory space.

In addition, although the RAM 20 has small size, that is, the capacity thereof is low, the utilization of the memory space can be optimized. Continuous addresses of the RAM 20, which are to be used to replace the addresses of the ROM 10 to be abandoned, can be defined as a segment. There may be a plurality of segments in the memory space of the RAM 10. Continuous unused addresses of the memory space of the RAM 20 can be defined as a region. There may also be a plurality of regions in the memory space of the RAM 20. The method for optimizing the utilization of the memory space is shown in FIG. 8.

The method comprises steps of putting the special instructions in respective specific addresses of the RAM 20 according to the addresses where the program codes are to be modified of the ROM 10; determining the number of regions and the size of each region; sorting the segments according to the size of each segment; sorting the regions according to the size of each region; putting the largest segment into the largest region according to the result of sorting (there may be a space remained in the region after the segment is put in); and sorting the regions according to the size of each region each time after one of the segment is put into one of the region. The steps of putting one of the segments into one of the regions and sorting the regions are repeated until all of the segments are put into the regions. By this manner, the memory space of the RAM 20 can be effectively used.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A CPU capable of modifying built-in program codes thereof comprising:

a read-only memory (ROM) for storing program codes;

a random-access memory (RAM) for storing a special instruction and modified program codes to substitute for some specific program codes in the ROM to be modified, said special instruction indicating an address of said modified program codes in the RAM;

a program counter connected to the ROM and the RAM for counting addresses of the ROM and the RAM; and a special instruction detecting circuit connected between the RAM and the program counter for instructing said program counter to restart to count from the address of the RAM indicated by said special instruction and drive the CPU to transfer to read said modified program codes in the RAM when said special instruction is detected.

2. The CPU as claimed in claim 1, wherein said RAM has a capacity lower than that of the ROM.

3. The CPU as claimed in claim 1, wherein said RAM has a jump instruction added at the end of said modified program codes to drive the CPU to return to read program codes subsequent to said some program codes to be modified in the ROM.

4. The CPU as claimed in claim 1, wherein said special instruction has a target data code indicating the address of said modified program codes in the RAM.

5. The CPU as claimed in claim 1, wherein said special instruction has an operation code so that said special instruction detecting circuit identifies the special instruction by checking said operation code.

6. The CPU as claimed in claim 5, wherein said special instruction detecting circuit identifies the special instruction by comparing said operation code with a built-in code.

7. The CPU as claimed in claim 6, wherein said special instruction detecting circuit comprises a first comparator for comparing said operation code of the special instruction and said built-in code.

8. The CPU as claimed in claim 1, wherein said special instruction has a page selecting code to be checked to identify an address of the ROM to where the program counter directs is the proper address indicating a start of the program codes to be modified when said special instruction is detected by the special instruction detecting circuit.

9. The CPU as claimed in claim 8, wherein said special instruction detecting circuit comprises a second comparator for comparing said page selecting code and a higher bit of the address of the ROM to where the program counter directs.

10. The CPU as claimed in claim 1, wherein the RAM is addressed in correspondence with lower addresses of the ROM.

11. The CPU as claimed in claim 1, further comprising a multiplexer connected to the ROM and the RAM for passing the program codes in the ROM to a subsequential stage of the CPU to execute in the normal operation, and to be switched to pass the modified program codes in the RAM to the subsequent stage of the CPU to execute when the special instruction is detected.

12. A CPU capable of modifying built-in program codes thereof comprising:

a read-only memory (ROM) for storing program codes;

a random-access memory (RAM) for storing a special instruction and modified program codes to substitute for some specific program codes in the ROM to be modified and having a capacity lower than the capacity of said ROM, said special instruction indicating an address of said modified program codes in the RAM;

a program counter connected to the ROM and the RAM for counting addresses of the ROM so that the program codes in the ROM are read when the CPU is in a normal operation;

a special instruction detecting circuit connected between the RAM and the program counter for instructing said program counter to restart to count from the address of the RAM indicated by said special instruction and drive the CPU to transfer to read said modified program codes in the RAM when said special instruction is detected; and a multiplexer connected to the ROM and the RAM for passing the program codes in the ROM to a subsequential stage of the CPU to execute in the normal operation, and to be switched to pass the modified program codes in the RAM to the subsequent stage of the CPU to execute when the special instruction is detected.

13. The CPU as claimed in claim 12, wherein said RAM has a jump instruction added at the end of said modified program codes to drive the CPU to transfer back to read program codes subsequent to said some program codes to be modified in the ROM.

14. A method for modifying built-in program codes of a CPU, said CPU comprising a ROM for storing the built-in program codes, a RAM having a lower capacity than that of the ROM, a program counter connected to the ROM and the RAM for counting addresses of the ROM to read the program codes in the ROM when the CPU is in a normal operation, said method comprising steps of:

directing to a corresponding address of the RAM by the program counter when the program counter counts one of the addresses of the ROM;

writing a special instruction to an address of the RAM corresponding to a starting one of the addresses of the program codes to be modified of the ROM, said special instruction indicating a new address of the RAM;

writing modified program codes to said new address of the RAM;

reading the ROM and RAM synchronously; and restarting to count from said new address of the RAM by the program counter to read the modified program codes therein when said special instruction is detected.

15. The method as claimed in claim 14, further comprising a step of:

returning to the ROM to read program codes of addressed subsequential to the addresses of the program codes to be modified, which have been neglected.

16. The method as claimed in claim 14, wherein said special instruction has a target data code indicating the address of said modified program codes in the RAM.

17. The method as claimed in claim 14, wherein said special instruction has an operation code to be used to identify said special instruction.

18. The method as claimed in claim 14, wherein said special instruction has a page selecting code to be checked to identify an address where the program counter directs is the proper address indicating the starting one of the addresses of the program codes to be modified when said special instruction is detected.

19. The method as claimed in claim 14, wherein the RAM is addressed in correspondence with lower addresses of the ROM.

* * * * *